US008244066B2

(12) United States Patent
Ives et al.

(10) Patent No.: US 8,244,066 B2
(45) Date of Patent: Aug. 14, 2012

(54) ADAPTIVE MEMBRANE SHAPE DEFORMATION SYSTEM

(75) Inventors: Neil A. Ives, Hawthorne, CA (US); Chia-Hsin Suen, San Francisco, CA (US); Martin S. Leung, Redondo Beach, CA (US); Nicholas J. Marechal, Tarzana, CA (US); Ivan Bekey, Annandale, VA (US); David C. Straw, Washington, DC (US); Maribeth Mason, Santa Monica, CA (US)

(73) Assignee: The Aerospace Corporation, El Segundo, CA (US)

( * ) Notice: Subject to any disclaimer, the term of this patent is extended or adjusted under 35 U.S.C. 154(b) by 931 days.

(21) Appl. No.: 12/077,986

(22) Filed: Mar. 24, 2008

(65) Prior Publication Data

US 2009/0238470 A1    Sep. 24, 2009

(51) Int. Cl.
G06K 9/36 (2006.01)

(52) U.S. Cl. ........ 382/286; 250/310; 250/311; 345/420; 351/212; 382/103; 382/128; 382/152; 382/154; 382/203; 382/217

(58) Field of Classification Search .................. None
See application file for complete search history.

(56) References Cited

U.S. PATENT DOCUMENTS

| 4,670,652 | A * | 6/1987 | Ichihashi et al. | 250/310 |
| 4,863,260 | A * | 9/1989 | Gersten et al. | 351/212 |
| 4,978,213 | A * | 12/1990 | El Hage | 351/212 |
| 4,995,716 | A * | 2/1991 | Warnicki et al. | 351/212 |
| 5,194,918 | A * | 3/1993 | Kino et al. | 356/497 |
| 5,796,859 | A * | 8/1998 | Mammone | 382/128 |
| 5,963,310 | A * | 10/1999 | Brown et al. | 356/35.5 |
| 6,262,429 | B1 * | 7/2001 | Rishton et al. | 250/492.23 |
| 6,510,244 | B2 * | 1/2003 | Proesmans et al. | 382/203 |
| 6,603,131 | B2 * | 8/2003 | Yamamoto | 250/492.1 |
| 6,611,343 | B1 | 8/2003 | Frankowski | |
| 6,621,929 | B1 * | 9/2003 | Lai et al. | 382/217 |
| 6,664,956 | B1 | 12/2003 | Erdem | |
| 6,709,116 | B1 | 3/2004 | Raskar et al. | |
| 6,756,590 | B2 * | 6/2004 | Kazui et al. | 850/9 |
| 6,760,488 | B1 | 7/2004 | Moura et al. | |
| 6,909,801 | B2 * | 6/2005 | Wenzel et al. | 382/152 |
| 6,956,568 | B2 * | 10/2005 | Maekawa et al. | 345/420 |
| 7,164,789 | B2 * | 1/2007 | Chen et al. | 382/154 |
| 7,310,431 | B2 * | 12/2007 | Gokturk et al. | 382/103 |
| 2003/0015660 | A1 * | 1/2003 | Shishido et al. | 250/311 |
| 2003/0128209 | A1 * | 7/2003 | Maekawa et al. | 345/420 |
| 2003/0135846 | A1 * | 7/2003 | Jayaram et al. | 717/137 |
| 2004/0072086 | A1 * | 4/2004 | Noudo et al. | 430/22 |
| 2004/0189545 | A1 * | 9/2004 | Bekey | 343/912 |
| 2005/0013477 | A1 * | 1/2005 | Ratti et al. | 382/154 |
| 2005/0274911 | A1 * | 12/2005 | Aloni et al. | 250/492.22 |
| 2006/0164653 | A1 * | 7/2006 | Everett et al. | 356/479 |
| 2008/0232679 | A1 * | 9/2008 | Hahn et al. | 382/154 |
| 2010/0074532 | A1 * | 3/2010 | Gordon et al. | 382/203 |

* cited by examiner

Primary Examiner — Anand Bhatnagar
Assistant Examiner — Tsung-Yin Tsai
(74) Attorney, Agent, or Firm — K&L Gates LLP

(57) ABSTRACT

A system and method determines the shape of a surface that preferably is a deployed space-based adaptive flexible membrane antenna, using patterned projections, image capturing, and membrane shape processing for producing membrane shape data describing the contour of the surface of the membrane with the membrane shape data then preferably used as inputs for a feedback control actuation system for deforming the membrane to a desired shaped so as to maintain the three-dimensional shape of the membrane in the desired shape.

7 Claims, 2 Drawing Sheets

ADAPTIVE MEMBRANE SHAPE DEFORMATION SYSTEM

ADAPTIVE MEMBRANE SHAPE DEFORMATION METHOD

ADAPTIVE MEMBRANE SHAPE DEFORMATION SYSTEM

FIELD OF THE INVENTION

The invention relates to the field of space antenna systems. More particularly, the present invention relates to a method of accurately deploying flexible antennas in space systems.

BACKGROUND OF THE INVENTION

The use of a lightweight antenna system is a desirable goal for space based communication systems. A system that uses a lightweight polymeric material configured as a large sheet that may be greater than thirty meters in diameter has been proposed as a suitable candidate for such applications. There exists, however a need to shape and maintain the sheet as to reflect directed signals in order to act as an antenna. Prior determinations of membrane shape have been the use of interferometry where diffraction pattern returns are analyzed. Diffraction shape determinations have been applied to adaptable mirrors and rigid reflective structures. Some designs for shape determination have used sensors that are attached to the antenna surface. However, the use of sensors adds weight to the membrane and thus detracts from the proposed lightweight property of the design.

U.S. Pat. No. 6,709,116, issued to Raskar, on Mar. 23, 2004 entitled a shape-adaptive projector system teaches a method to adapt an output image to a shape of a display surface. First, a structured pattern is projected onto the display surface by a projector. An image having a structured pattern is acquired by a camera in a fixed physical relationship with the projector. From the input image, a mesh of the structured pattern is determined in a coordinate frame of the projector. Coordinates of a texture are determined in the coordinate frame of the projector. The coordinates of the texture are updated according to the display region. The texture is then mapped to the mesh, and the textured mesh is rendered on the display surface. Patterned illumination of an object and the capturing of returns by a camera are well known.

U.S. Pat. No. 6,664,956, issued to Erdem on Dec. 16, 2003, entitled method for generating a personalized 3-D face model, teaches a method for generating a 3-D model of a person's face is disclosed. The 3-D face model carries both the geometry shape and the texture color characteristics of the person's face. The shape of the face model is represented via a 3-D triangular mesh, while the texture of the face model is represented via a 2-D composite textured image. The triangular geometry mesh is obtained by deforming a predefined standard 3-D triangular mesh based on the dimensions and relative positions of the person's facial features, such as eyes, nose, ears, lips, and chin. The texture image is obtained using a set of 2-D images of the person's face, which are taken from particular directions such as front, right, left, etc, and modifying the images along region boundaries to achieve seamless stitching of color on the 3-D face model. The directional images are taken while the mouth is closed and the eyes are open. In order to capture the color information of the facial regions that are not visible in the directional images, that is, the inside of the mouth and the outside of the eyelids, additional 2-D images are also taken and included in the textured image.

U.S. Pat. No. 6,760,488, issued to Moura on Jul. 6, 2004, entitled system and method for generating a three-dimensional model from a two-dimensional image sequence, teaches a system for generating a three-dimensional model of an object from a two-dimensional image sequence. According to one embodiment, the system includes an image sensor for capturing a sequence of two-dimensional images of a scene. The scene includes the object. The system also includes a two-dimensional motion filter module in communication with the image sensor for determining from the sequence of images a plurality of two-dimensional motion parameters for the object. The system further includes a three-dimensional structure recovery module in communication with the two-dimensional motion filter module for estimating a set of three-dimensional shape parameters and a set of three-dimensional motion parameters from the set of two-dimensional motion parameters using a rank one factorization of a matrix.

U.S. Pat. No. 6,756,590, issued to Kazui on Jun. 29, 2004, entitled Shape measurement method and apparatus, teaches an electron beam applied from an electron gun. The beam is reflected off a surface of a specimen placed on a stage that is tilted at a tilt angle. Return intensities are measured by an electron detector. Based upon the measurement, an image processing unit calculates a slope angle of the surface of the specimen, and determines candidates for cross-sectional shape of the specimen. Signal intensity of the electromagnetic wave is reflected from a surface having a cross-sectional shape of each of the candidates when the tilt angle is estimated, and then compared with a signal intensity actually measured by the electron detector with the tilt angle. Consequently, cross sectional shape and three-dimensional shape can be determined based upon a result of comparison, without utilizing a matching process of feature points.

U.S. Pat. No. 6,611,343 issued to Frankowski on Aug. 26, 2003, entitled method and device for 3D measurement teaches a procedure and a device for contact-free, optoelectronic 3D measuring of objects. Especially partially automated and automated manufacturing processes with constantly decreasing cycle times and higher precision requirements demand modern measuring procedures and devices, monitoring the quality criteria required, and controlling manufacturing processes. A procedure and device is introduced to extend the application of computerized 3D-measuring technology and for online-integration into the production process. Within a single recording cycle, arbitrary line patterns suitable for 3D-measuring technology and defined intensity structures are projected via a micromirror projector for object coding.

Hilbert transforms for transforming image data into a complex image is well known using forward transformations, bandpass filtering, and inverse transformations. Two-dimensional phase unwrapping by interpolation is also well known as a key algorithm for topographic mapping with interferometric synthetic aperture radar. A least squares formulation for unwrapping leads to a discrete Poisson equation with boundary conditions to be solved. A large linear system of equations for the unwrapped phase disadvantageously results. For example a 100 by 100 sample data set leads to a sparse matrix with 10,000 rows and 10,000 columns to invert. 2-D unwrapped phase data has been generated from complex images. 2-D unwrapped phase data has been interpolated to a coordinate system. The generation of unwrapped phase data and the unwrapping of phase data are well known.

The prior shape determination methods have used various means and processes, such as diffraction methods, for determining the shape of a surface. Various processing means have been used to implement Hilbert transforms of image data, unwrapping of wrapped phase data, and interpolations of wrapped data to a coordinate system. Such processes have not been integrated for adaptively correcting deformities in a flexible membrane. These and other disadvantages are solved or reduced using the invention.

SUMMARY OF THE INVENTION

An object of the invention is to provide a method for determining the shape of a surface.

Another object of the invention is to provide a method for determining the shape of a flexible surface.

Yet another object of the invention is to provide a method for determining the shape of a flexible membrane and deforming the shape of a flexible membrane into a desired membrane shape.

Still another object of the invention is to provide a method for determining the shape of a flexible antenna membrane through projecting a patterned image upon the membrane, capturing returns, and computing the shape of the membrane.

A further object of the invention is to provide a method for determining the shape of a flexible antenna membrane by projecting a patterned image upon the membrane, capturing returns, computing the shape of the membrane using transformation and unwrapping processes upon the captured returns.

Yet a further object of the invention is to provide a method for determining and correcting the shape of a flexible adaptable antenna membrane by projecting a patterned image upon the membrane, capturing returns, computing the shape of the membrane using transform and wrapping processes upon the captured returns, and generating a raster electron gun beam for selective exposures of the membrane for localized deforming of the flexible membrane into the desired shape.

The invention is directed to a method for determining the shape of a flexible membrane. The method is further used for deforming a flexible deployable membrane. The method first captures 3-dimensional shape data of a membrane that may be a flexible deployable space based adaptive membrane antenna. The method then determines the shape of the membrane. The determined membrane shape is then compared to a desired shape. The membrane shape is then altered by actuation so that the membrane shape is deformed into a desired shape. The method can be applied to a system for maintaining the shape of the membrane to a desired shape. The system and method would include image capturing, image data processing, and activation beams for deforming the membrane shape into the desired shape.

The method employs mathematical Hilbert transformations of captured image data into complex image data. The complex image data is used to generate 2-dimensional wrapped phase data from the captured image data. The 2-dimensional wrapped phase data describes in phases and magnitudes at pixels the shape of the membrane. The unwrapped data is scaled into the spatial domain and then interpolated into a coordinate reference for comparison to the desired shape in the same coordinate frame. A difference between the determined shape and the desired shape can be corrected using an actuation means, such as an electron gun. The membrane is preferably a piezoelectric membrane reacting to electron beam exposures for adaptively correcting the membrane shape to the desired shaped.

The system preferably includes a conventional image capture subsystem for generating captured image data of the deformed shape of the membrane. The system further includes a shape determination subsystem executing a shape determination method for generating membrane shape data from captured image data. The system also includes a conventional actuation subsystem for determining the difference between the current deformed shape and desired shape. The actuation subsystem controls an actuator for changing the shape of the membrane from the deformed shape to the desired shape. The subsystems can be combined as part of an adaptive membrane control system for adaptively maintaining the shape of an adaptive flexible membrane antenna. Surface shapes can be determine by using noncontacting profilometric processes based on fringe projection.

To determine the shape of the membranes, the imaging method projects an optical pattern onto to a surface while an imaging system captures and processes the captured data to determine the shape of the surface of the membrane. The method uses coarse pixel unwrapping for minimizing computational burdens. The method is a contact-free imaging and deforming method. The method has space-based applications to determine the shape of an adaptive membrane antenna. These and other advantages will become more apparent from the following detailed description of the preferred embodiment.

DETAILED DESCRIPTION OF THE PREFERRED EMBODIMENT

Figure 1:
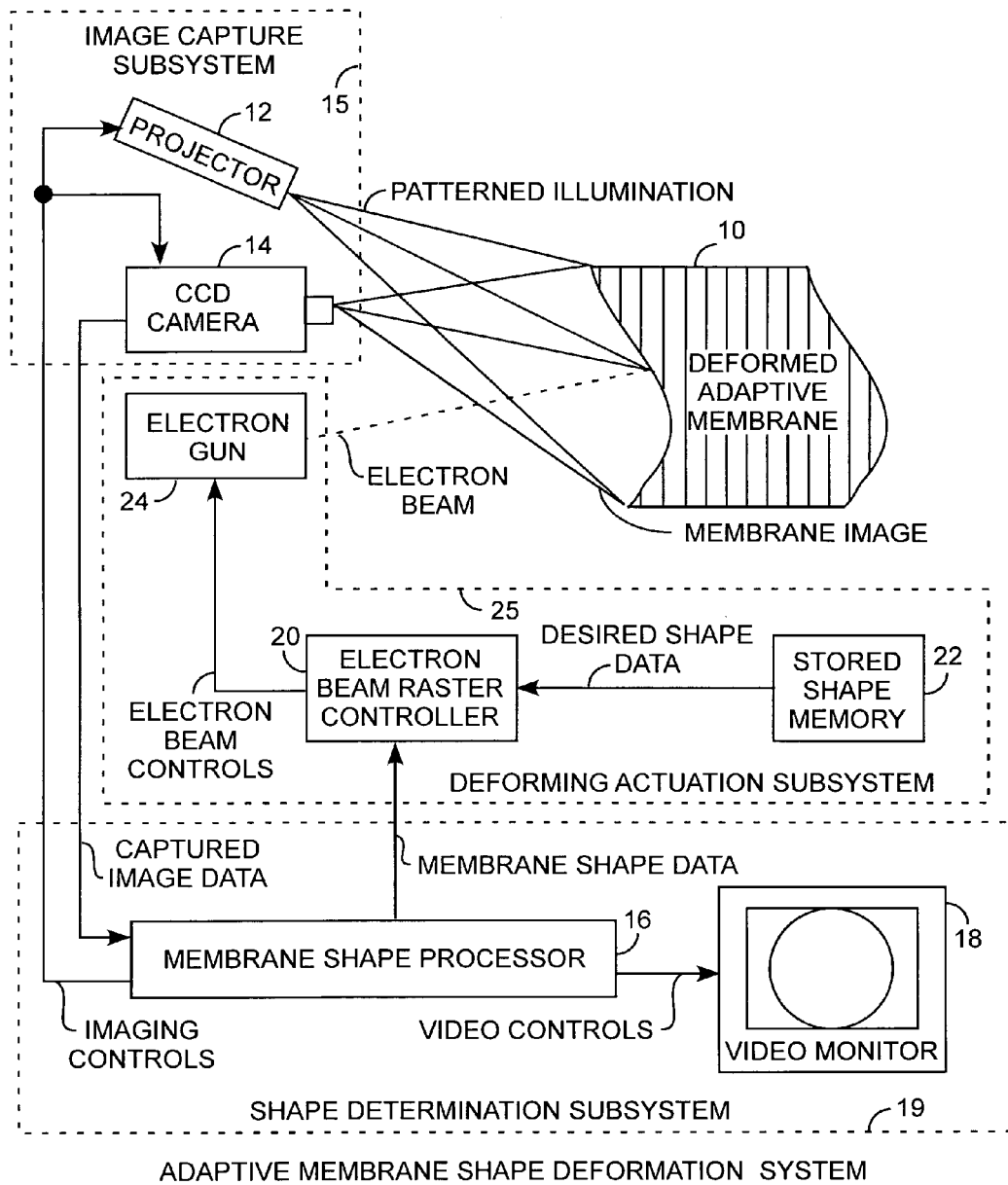
FIG. 1 is a block diagram of an adaptive membrane Control System.

An embodiment of the invention is described with reference to the figures using reference designations as shown in the figures. Referring to FIG. 1, an adaptive membrane shape deformation system includes a deformed adaptive membrane 10 that is exposed by a patterned illumination from a projector 14. The patterned illumination is preferably in the visual electromagnetic spectrum and preferably comprises parallel alternative light and dark lines, though other spectra and patterns could be used. The patterned illumination reflects off of the membrane 10 as reflected returns of a membrane image that is captured by an optical imager such as a charge coupled device (CCD) camera 12 for providing captured image data. The projector 14 and CCD camera may be preferably combined as an image capture subsystem 15. The image capture subsystem 15 preferably uses a high-resolution CCD camera 14 to acquire a digital image of the surface as a membrane image of the deformed adaptive membrane 10. The projector 14 projects a regular pattern onto the surface of the membrane 10 under imaging controls. The membrane image preferably spans the entire surface to the edges of membrane 10. The membrane image of the membrane 10 is acquired and captured by a CCD camera 14 under imaging controls.

After capturing the image data, the CCD camera 12 provides captured image data to a membrane shape processor 16. The membrane shape processor 16 determines the shape of the deformed membrane 10 using a membrane shape determination method for generating membrane shape data. The membrane shape data may be displayed on a video monitor 18 or communicated to a display system using video control signals. The memory shape processor 14 and video monitor 18 or alternative storage or display means may be combined as a shape determination subsystem. The deformed adaptive membrane is preferably an adaptable flexible membrane antenna. The video monitor is preferably part of a ground station receiving and displaying the membrane shape data. The adaptive membrane shape deformation system uses an illumination source, such as the projector 12, to project a set of parallel straight lines or fringes of the pattern illumination onto the surface of the membrane 10. The CCD camera 14 captures returns of the reflected image of the line pattern projected onto the surface. Shape of the surface is then obtained from decoding distortions in the captured fringe pattern.

The membrane shape data is communicated to an electron beam raster controller 20 for changing the shape of the deformed membrane into the desired shape. A desired membrane shape is stored in a stored shape memory 22. The electron beam raster controller 20 uses the desired membrane shape and the actual membrane shape data to generate electron beam controls that activate an electron gun 24 producing an electron beam aimed at the deformed adaptive membrane 10 to deform the deformed adaptive membrane into the desired membrane shape. The memory 22, raster controller 20, and the electron gun 24 may be preferably combined into a deforming actuation subsystem 25. The electron beam raster controller 20 receives the desired shape data from the stored shape memory 22 for controlling the electron gun 24 to emit the directed electron beam towards selected areas of the membrane 10 for exposing in sequence one or more localized areas of the membrane 10. The membrane 10 reacts to the impinging electrons from the electron gun 24 through piezoelectric actuation for adaptive changing of the shape of the membrane 10 from the deformed membrane shape indicated by the membrane shape data to the desired membrane shape indicated by the desired shape data. The desired shape data and the membrane shape data are preferably within similar data structures for ease of generating the electron beam controls.

Figure 2:
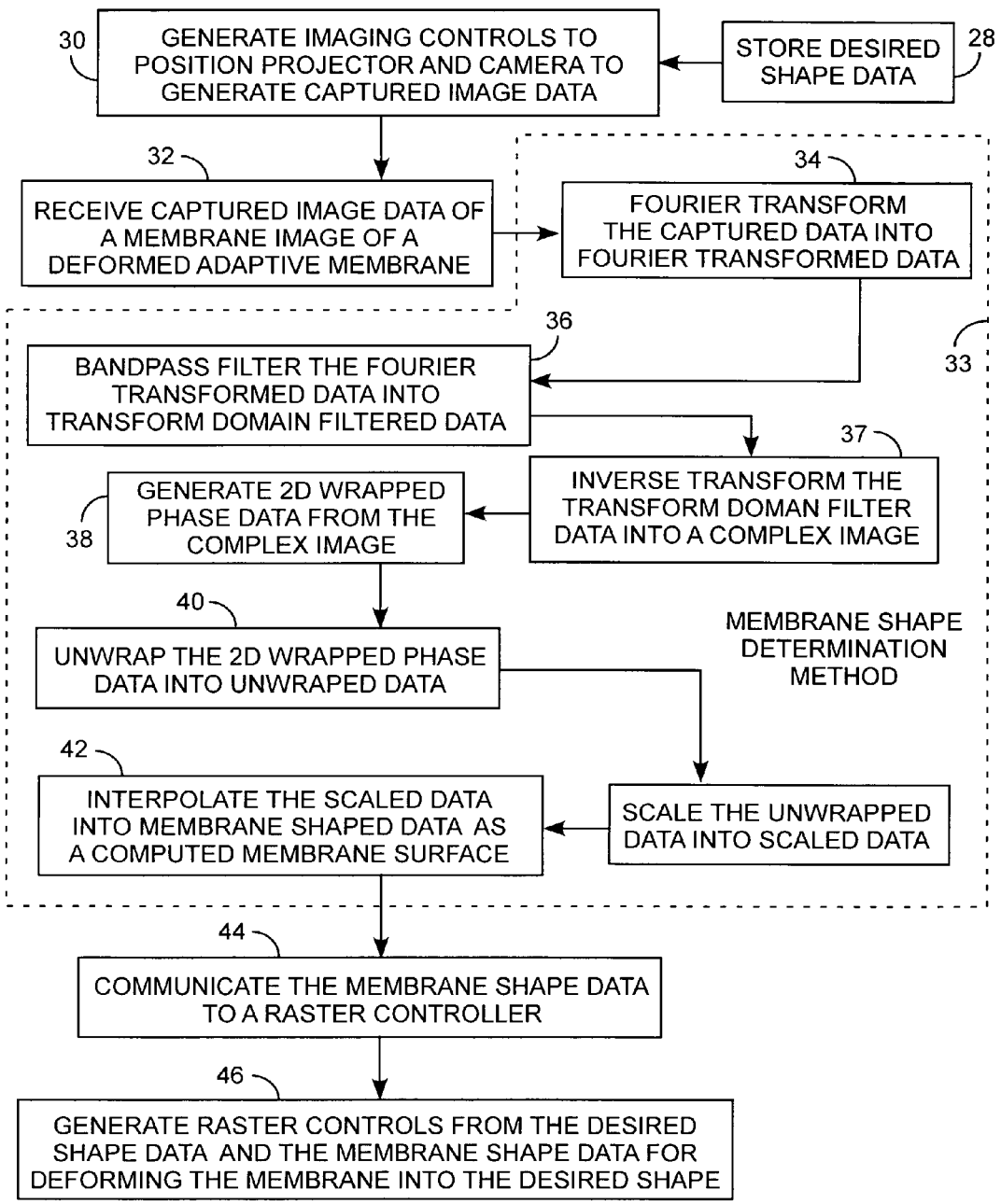
FIG. 2 is a process flow of membrane shape determination method.

Referring to FIGS. 1 and 2, an adaptive membrane shape deformation method is executed in part by the membrane shape processor 16. The method can be used to maintain the membrane to conform to stored desired shaped 28. The deforming actuation subsystem can store 28 the desired membrane shape in the memory 22. The adaptive membrane shape deformation method is initiated by communicating imaging control signals 30 to the projector 12 and camera 14 for positioning and commanding the projector 12 and camera 14 to illuminate the deformed adaptive membrane 10. The projector 12 illuminates the membrane 10 with a pattern illumination. The camera 14 then captures illumination returns from the membrane image. The illuminated returns are captured image data that is communicated to the membrane shape processor 16. The membrane shape processor 16 generates imaging controls 30 for controlling the image capture subsystem 15 for generating the captured data 30. The membrane shape processor 16 then receives 32 the capture image data 32 of the membrane image of the deformed adaptive membrane 10.

The membrane shape processor 16 processes the captured image data into the membrane shape data using the membrane shape determination method 33 including steps 34 through 42. The captured image data is Hilbert transformed into a complex image. The Hilbert transform is perfected by Fourier transformations 34 of the captured data into transformed data. The transformed data is bandpass filtered 36 for generating filtered data. The filtered data is inverse Fourier transformed 37 into complex image data. Hilbert and Fourier transformations are well known.

The complex image data is converted into 2D wrapped phase data using an arc-tangent function. Generating 2D wrapped phase data using an inverse arc-tangent function is well known. The wrapped data is unwrapped 40 into unwrapped data. The unwrapped data is unwrapped preferably at coarse pixels. Coarse pixel unwrapping conserves computational resources. The unwrapped data is then scaled 41 into scaled data in the spatial domain. The scaled data is then interpolated 42 into the membrane shape data as a computed membrane surface in reference to a coordinate frame of the membrane. The membrane shape data is represented in a 3D coordinate system that preferably matches the coordinate system with which the desired shape data is stored.

The membrane shape data is communicated 44 to the electron beam raster controller 20. The electron beam raster controller 20 translates the membrane shape data as compared by pixel in a common coordinate reference frame with the desired shape data into electron beam controls. The electron beam controls are communicated to the electron gun for exposing the deformed adaptive membrane 10 so as to deform the membrane 10 towards the desired shape indicated by the desired shape data. The adaptive membrane shape deformation method allows for the unfurling or post unfurling deforming of the adaptive membrane 10 into a desired shape.

The membrane shape determination method 33 includes steps 34 through 42 that are individually within the ordinary skills in the art. The captured image data is mathematically processed by the membrane shape processor 16 using conventional Hilbert transforms, 2D wrapped phase data generation, and phase unwrapping to transform the captured image data of the shape of the surface of the membrane 10. The steps 34 through 42 of the membrane shape determination method 33 are based upon a coordinate system. Displacement ranges with respect to a projected coordinate system are computed. The projected coordinate system defines the outer bounds of the membrane 10. A three dimensional representation of the surface of the membrane 10 is computed and displayed using the image display 18 and conventional display software. The 2D wrapped phase data obtained from a complex image can be used for feedback control using the electron beam controls and the imaging controls for deforming the membrane 10 using the deforming actuation subsystem 25, image capture subsystem 15, and the shape determination subsystem 19.

The shape determination method receives captured image data that is preferably generated using a fringe illumination pattern. The adaptive membrane shape deformation method enables accurate measurements of the membrane under the influence of and during an applied actuation in feed back control. The fringe projection illumination by the projector 12 can be used to determine shape changes in the membrane surface 10 before and after electron gun treatment of the member. The adaptive membrane shape deformation method can be repetitively executed without electron gun activation to determine shape changes over the mere passage of time.

In practice, measurement of the deformed membrane shape begins with a digital image of the membrane 10 with striped patterned illumination. The captured image data is transformed into real valued data with the observed amplitude modulation of the stripe pattern. The image data with the observed amplitude modulation of the captured image data is transformed into complex valued image data in which the modulation is encoded into the phase. The phase is a scaling of the relative surface topography with the scale factor given by the particular geometry of the projector 12, surface 10, and imager 14. The captured image data is translated into real valued data in the spatial domain when scaled. The Fourier transformed data is necessarily conjugate symmetric with pixelized amplitude energy peaks that are observed at the fundamental and harmonic wave numbers of the spatial frequencies that are determined by the striped pattern illumination.

The Hilbert transformation complex image data has fundamental wave number translated to a zero wave number. The Hilbert transformations select first order perturbation of the captured image data for providing the transform domain filtered data. The 2D wrapped phase data represented in the polar domain. The argument or phase of the spatial domain data is computed as an inverse arc-tangent and therefore is ambiguous to integer multiples of $2\pi$ where a transition from dark to light to dark again represents phase change of $2\pi$. The spatial domain data is derived from the 2D wrapped phase data. Scaling of the unwrapped data translates the image data into spatial data for further interpolations as needed. The membrane shape data is computed from the interpolation of the scaled data for generating the membrane shape data from the original sampling of the captured image data.

The adaptive membrane shape deformation system and method can be applied to applications of flexible surfaces such as space-based flexible antenna designs and implementations as well as other adaptable surface subject to an actuations capability. The system and method is a non-contact optical sensing and adaptive system and method desirable preferably for large space-based structures. In addition, the system and method can be constructed from conventional components using conventional data structures. The system can include an actuation subsystem to shape the antenna for specific operational configurations. Those skilled in the art can make enhancements, improvements, and modifications to the invention, and these enhancements, improvements, and modifications may nonetheless fall within the spirit and scope of the following claims.

What is claimed is:

1. A system comprising,
an image capture subsystem for providing a patterned illumination of light upon a surface of a space-based flexible membrane antenna and capturing reflective returns of light from the space-based flexible membrane antenna as captured image data of a shape of the surface of the space-based flexible membrane antenna, wherein the space-based flexible membrane antenna comprises piezoelectric material,
a shape determination subsystem for receiving the captured image data from the image capture subsystem and providing membrane shape data by determining the shape of the surface, the shape determination subsystem implementing a membrane shape determination method comprising the steps of,
Hilbert transforming the image data into complex image data, generating 2-dimensional wrapped phase data from the complex image data, unwrapping the 2-dimensional wrapped phase data into unwrapped data, and converting the unwrapped data into shape data defining the shape of the surface, and
a deformation actuation subsystem for deforming the shape of the surface of the space-based flexible membrane antenna to a desired shape, wherein the deformation actuation subsystem comprises:
an electron gun; and
a controller for determining control signals for the electron gun based on at least the membrane shape data determined by the shape determination subsystem and the desired shape for the surface of the space-based flexible membrane antenna,
wherein the electron gun is for impinging electrons on the surface of the space-based flexible membrane antenna to thereby deform the shape of the space-based flexible membrane antenna to the desired shape through piezoelectric actuation.

2. The system of claim 1, wherein the controller of the deformation actuation subsystem is for comparing the membrane shape data to the desired shape data to determine the control signals for the electron gun.

3. The system of claim 1 wherein the image capture subsystem comprises,
a projector for projecting the patterned illumination of light onto the surface of the space-based flexible membrane antenna, and
a camera for capturing the reflective returns of light from the surface as the captured image data.

4. The system of claim 1, wherein the deformation actuation subsystem comprises a memory for storing the desired shape data.

5. The system of claim 1, wherein the controller of the deformation actuation subsystem comprises an electron beam raster controller.

6. A system comprising:
an image capture subsystem comprising:
an image projector for projecting an illumination pattern of light on a surface of a flexible membrane antenna, wherein the flexible membrane antenna comprises piezoelectric material; and
an optical image capturing device for capturing reflected returns of light of the illumination pattern from the surface of the flexible membrane antenna;
a shape determination subsystem comprising a processor, wherein the shape determination subsystem is in communication with the image capture subsystem, and wherein the shape determination subsystem is for determining a shape of the surface of the flexible membrane antenna based on the captured reflected returns of the illumination pattern from the surface of the flexible membrane antenna; and
a deformation actuation subsystem in communication with the shape determination system, wherein the deformation actuation subsystem is for deforming the shape of the surface of the space-based flexible membrane antenna to a desired shape, wherein the deformation actuation subsystem comprises:
an electron gun; and
a controller for determining control signals for the electron gun based on at least the shape of the surface of the flexible membrane antenna determined by the shape determination subsystem and the desired shape for the surface of the flexible membrane antenna,
wherein the electron gun is for impinging electrons on the surface of the space-based flexible membrane antenna to thereby deform the shape of the flexible membrane antenna to the desired shape through piezoelectric actuation.

7. The system of claim 6, wherein the shape determination subsystem is for determining the shape of the surface by:
Hilbert transforming the image data into complex image data;
generating 2-dimensional wrapped phase data from the complex image data;
unwrapping the 2-dimensional wrapped phase data into unwrapped data; and
converting the unwrapped data into shape data defining the shape of the surface.

* * * * *